(12) United States Patent
Harayama et al.

(10) Patent No.: US 10,170,797 B2
(45) Date of Patent: Jan. 1, 2019

(54) NONAQUEOUS ELECTROLYTE SECONDARY BATTERY

(71) Applicant: TOYOTA JIDOSHA KABUSHIKI KAISHA, Toyota-shi, Aichi (JP)

(72) Inventors: Takashi Harayama, Toyota (JP); Hiroshi Onizuka, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 82 days.

(21) Appl. No.: 15/517,789

(22) PCT Filed: Sep. 9, 2015

(86) PCT No.: PCT/JP2015/004595
§ 371 (c)(1),
(2) Date: Apr. 7, 2017

(87) PCT Pub. No.: WO2016/056170
PCT Pub. Date: Apr. 14, 2016

(65) Prior Publication Data
US 2018/0269533 A1 Sep. 20, 2018

(30) Foreign Application Priority Data
Oct. 10, 2014 (JP) .................................. 2014-209482

(51) Int. Cl.
*H01M 10/05* (2010.01)
*H01M 6/16* (2006.01)
(Continued)

(52) U.S. Cl.
CPC ..... *H01M 10/0587* (2013.01); *H01M 2/0237* (2013.01); *H01M 2/1646* (2013.01);
(Continued)

(58) Field of Classification Search
None
See application file for complete search history.

(56) References Cited

U.S. PATENT DOCUMENTS 6,337,153 B1 1/2002 Kodama et al.
2007/0231700 A1* 10/2007 Watanabe ............. H01M 2/145
429/246

(Continued)

FOREIGN PATENT DOCUMENTS

CN 103733390 A 4/2014
CN 104054207 A 9/2014
(Continued)

OTHER PUBLICATIONS

International Search Report for PCT/JP2015/004595, dated Dec. 8, 2015.

*Primary Examiner* — Scott J. Chmielecki
(74) *Attorney, Agent, or Firm* — Sughrue Mion, PLLC

(57) ABSTRACT

A lithium ion battery has a flat wound electrode assembly, a nonaqueous electrolyte, and a battery case. The nonaqueous electrolyte contains an electrically insulating inorganic aggregate and is formed of an impregnating electrolyte impregnated into the flat wound electrode assembly and a surplus electrolyte not impregnated into the flat wound electrode assembly. Letting the flat wound electrode assembly be divided into a planar region where the electrode surfaces are planar surfaces and a lower wound curved region which is positioned vertically downward from the planar region and where the electrode surfaces are curved, a boundary plane that includes the boundary between the planar region and the lower wound curved region, the inorganic aggregate amount $M_O$ included in a space which is below the boundary plane and the inorganic aggregate amount $M_I$ included in the impregnating electrolyte within (Continued)

the flat wound electrode assembly satisfy the relationship $M_O > M_I$.

7 Claims, 6 Drawing Sheets

(51) Int. Cl.
    *H01M 10/0587*     (2010.01)
    *H01M 10/0525*     (2010.01)
    *H01M 2/16*     (2006.01)
    *H01M 2/02*     (2006.01)
    *H01M 10/42*     (2006.01)

(52) U.S. Cl.
    CPC ....... *H01M 6/168* (2013.01); *H01M 10/0525* (2013.01); *H01M 10/4235* (2013.01); *H01M 2220/20* (2013.01)

(56) References Cited

U.S. PATENT DOCUMENTS

| | | | |
|---|---|---|---|
| 2012/0208070 A1* | 8/2012 | Nakashima | H01M 2/1646 429/158 |
| 2013/0337304 A1 | 12/2013 | Luski et al. | |
| 2014/0170487 A1 | 6/2014 | Takahata et al. | |
| 2014/0272534 A1* | 9/2014 | Ueki | H01M 2/1646 429/144 |
| 2014/0342200 A1 | 11/2014 | Morita et al. | |

FOREIGN PATENT DOCUMENTS

| | | |
|---|---|---|
| JP | 2001-202990 A | 7/2001 |
| JP | 2013-109866 A | 6/2013 |

\* cited by examiner

NONAQUEOUS ELECTROLYTE SECONDARY BATTERY

TECHNICAL FIELD

The present invention relates to a nonaqueous electrolyte secondary battery provided with a flat wound electrode assembly. This application claims priority from Japanese Patent Application No. 2014-209482 filed on Oct. 10, 2014, the entire contents of which are incorporated herein by reference.

BACKGROUND ART

Nonaqueous electrolyte secondary batteries such as lithium ion batteries (lithium ion secondary batteries), because they are lightweight and have a high energy density compared with existing batteries, have been used in recent years as so-called portable power sources for personal computers, handheld devices and the like, and as power sources for propelling vehicles. In particular, lithium ion batteries, which are lightweight and capable of achieving a high energy density, are favored for use as a high-output power source for propelling vehicles such as electric vehicles (EV), hybrid vehicles (HV) and plug-in hybrid vehicles (PHV).

This type of nonaqueous electrolyte secondary battery is constructed by housing an electrode assembly having a positive electrode and a negative electrode with a separator therebetween, together with a nonaqueous electrolyte, in a battery case. In particular, nonaqueous electrolyte secondary batteries which are used as, for example, power sources for propelling vehicles, in order to stably supply a large current, have a wound electrode assembly in which are wound a strip-shaped positive electrode and negative electrode.

CITATION LIST

Patent Literature

[PTL 1]
Japanese Patent Application Laid-open No. 2013-109866

SUMMARY OF INVENTION

Technical Problem

However, in very low temperature environments such as at −30° C. or below, the nonaqueous electrolyte tends to undergo an increase in viscosity or to freeze, which may lower the battery performance.

The invention was conceived in order to resolve this problem. An object of the invention is to provide a nonaqueous electrolyte secondary battery which suppresses freezing of the nonaqueous electrolyte solution. Another object is to provide a battery pack containing such nonaqueous electrolyte secondary batteries.

Solution to Problem

The inventors have conducted extensive investigations on the relationship between the state of the nonaqueous electrolyte and the battery resistance in very low temperature environments at −30° C. and below. As a result, they have discovered that, in a battery having a flat wound electrode assembly, when surplus nonaqueous electrolyte more than amply supplied within the battery case is present in addition to the nonaqueous electrolyte that impregnates into the electrode assembly, this surplus electrolyte tends to freeze. In addition, the inventors have learned that, quite apart from adjusting the makeup of the nonaqueous electrolyte, adding a suitable amount of an inorganic aggregate to the nonaqueous electrolyte is highly effective for suppressing viscosity increases and freezing of the nonaqueous electrolyte. The art disclosed herein was ultimately arrived at based on these findings.

Accordingly, this invention provides a nonaqueous electrolyte secondary battery having a flat wound electrode assembly, a nonaqueous electrolyte, and a battery case which houses the flat wound electrode assembly and the nonaqueous electrolyte. The flat wound electrode assembly is formed from a strip-shaped positive electrode and a strip-shaped negative electrode which are arranged with a separator therebetween and wound in such a manner that the assembly has an oval cross-sectional shape perpendicular to a winding axis. The nonaqueous electrolyte contains an insulating inorganic aggregate and is formed of an impregnating electrolyte that is impregnated into the flat wound electrode assembly and a surplus electrolyte that is not impregnated into the flat wound electrode assembly. The battery case includes a prismatic case body having an opening therein for inserting the flat wound electrode assembly, and a sealing member for sealing the opening in the case body. When the battery case is placed on a horizontal surface so that the sealing member becomes the top side of the battery case, the flat wound electrode assembly is housed within the battery case in such a manner that the major axis of the oval is vertically oriented. Letting the flat wound electrode assembly be divided into a planar region where the electrode surfaces are planar surfaces, an upper wound curved region which is positioned vertically upward from the planar region and where the electrode faces are curved surfaces, and a lower wound curved region which is positioned vertically downward from the planar region and where the electrode faces are curved surfaces, and letting a space between the battery case and the flat wound electrode assembly be divided by a boundary plane B that includes a boundary between the planar region and the lower wound curved region, an amount $M_O$ of the inorganic aggregate included in a space which is outside of the flat wound electrode assembly and below the boundary plane B and an amount $M_I$ of the inorganic aggregate included in the impregnating electrolyte within the entire flat wound electrode assembly satisfy the relationship $M_O > M_I$.

From the findings of the inventors, it was apparent that an increase in viscosity and freezing of the nonaqueous electrolyte in very low-temperature environments can clearly arise in the surplus nonaqueous electrolyte (surplus electrolyte) that does not impregnate the electrode assembly and is present in the lower part of the battery case. With the foregoing arrangement, viscosity increases and freezing in very low-temperature environments can be reliably suppressed, thus making it possible, for example, to suppress a rise in the battery resistance and to prevent a decrease in the battery characteristics (e.g., high-rate discharge characteristics).

In this Description, "oval" refers to a combined shape obtained by dividing a circle at the diameter thereof into two semicircles and inserting between the two semicircles a rectangle whose short sides correspond to the diameter of the circle, and includes such shapes as barrel shapes and track shapes (see FIG. 2). In this oval, the diameter of the semicircular portions (which is also the length of the short sides of the rectangle) is referred to as the "minor axis" of the oval, and the length in the direction perpendicular thereto (i.e., the length of the long side plus the diameter) is referred to as the "major axis."

In a preferred embodiment, the nonaqueous electrolyte secondary battery disclosed herein is characterized in that the positive electrode and the negative electrode each include a strip-shaped current collector which has, on one edge along a lengthwise direction thereof, an exposed current collector region and is provided with, on a region other than the current collector-exposing region, an active material layer. The exposed current collector region of the positive electrode and the exposed current collector region of the negative electrode are arranged so as to protrude from, respectively, a first edge and a second edge of the wound electrode assembly in a width direction perpendicular to the lengthwise direction, and the positive electrode and the negative electrode are wound using the width direction as the axis of winding. The wound electrode assembly is configured so as to collect current from the positive electrode and the negative electrode at a current-collecting area where the exposed current collector regions of the positive electrode and the negative electrode are respectively bunched up in the minor axis direction of the oval, and the current-collecting area is positioned above the center in the major axis direction of the oval. In such a battery, the proportion (volume) accounted for by the wound curved region positioned downward in the major axis direction of the flat wound electrode assembly (referred to below as the "lower wound curved region") is large, and so there is a possibility of the impregnating electrolyte present in the lower wound curve region more fully incurring the influence of viscosity increases and freezing. Therefore, suppressing viscosity increases and freezing of the nonaqueous electrolyte in a battery having such a construction is desirable for enabling the advantages of the art disclosed herein to be more effectively achieved.

In a preferred embodiment, the nonaqueous electrolyte secondary battery disclosed herein is characterized in that the amount of the inorganic aggregate included in the surplus electrolyte below the boundary plane B is 0.01 ppm or more and 100 ppm or less. Such an arrangement is desirable for enabling the above advantages to be achieved without excessively increasing the battery weight.

In a preferred embodiment, the nonaqueous electrolyte secondary battery disclosed herein is characterized in that the separator has pores therein, and the inorganic aggregate has an average particle size which is larger than an average pore size of the separator. This arrangement is desirable because clogging of the separator can be prevented when inorganic aggregate has been included in the flat wound electrode assembly.

In this Description, the average particle size of a powder such as inorganic aggregate refers to the particle diameter at a cumulative value of 50% in the volume-basis particle size distribution (50% volume average particle diameter) measured with a particle size analyzer based on the laser diffraction scattering method.

The average pore size is defined as the arithmetic average of the circle-equivalent diameters of at least 100 pores examined by a means of observation such as an electron microscope.

In a preferred embodiment, the nonaqueous electrolyte secondary battery disclosed herein is characterized in that the inorganic aggregate is at least one selected from the group consisting of alumina, silica, zirconia, yttria and mullite. Such an inorganic aggregate is preferable because it can be stably present in the nonaqueous electrolyte.

In another aspect of the invention, a battery pack provided by the art disclosed herein is characterized by having a plurality of any of the foregoing nonaqueous electrolyte secondary batteries, the plurality of nonaqueous electrolyte secondary batteries being connected in series or in parallel. A battery pack of this arrangement is especially preferable for use as a power source for propelling vehicles used in regions where the outside temperature falls to extremely low temperatures of −30° C. and below.

In a preferred embodiment, the battery pack disclosed herein is characterized in that the plurality of nonaqueous electrolyte secondary batteries are restrained in such a manner as to apply a pressure of 1 kN or more and 10 kN or less to the planar region of the flat wound electrode assembly. This is desirable because, in a flat wound electrode assembly to which such a restraining load has been applied, the surplus electrolyte readily collects in the lower wound curved region, thus enabling the above advantages to be more clearly achieved.

DESCRIPTION OF EMBODIMENTS

Preferred embodiments of the nonaqueous electrolyte secondary battery of the invention are described below while suitably referring to the diagrams. Technical matters which are required for carrying out the present invention but are not particularly mentioned in the present Description (e.g., a battery structure that is not distinctive to the invention) will be understood by persons of ordinary skill in the art as matters of design which are based on prior art in the field to which the invention relates. The present invention can be practiced based on the technical details disclosed in this Description and on common general technical knowledge in the field. Relative dimensions (such as length, width and depth) of features shown in the diagrams may not be true to scale. The nonaqueous electrolyte secondary battery of the invention is not intended to be limited to the following embodiments.

In this Description, "nonaqueous electrolyte secondary battery" refers generally to a battery which can be repeatedly charged and discharged and which uses a nonaqueous liquid electrolyte solution as the electrolyte. This typically encompasses secondary batteries which utilize lithium (Li) ions as the electrolyte ions (charge carriers) and in which charging and discharging arise with the movement of these lithium ions between the positive and negative electrodes. Those secondary batteries generally referred to as, for example, lithium ion batteries (or lithium ion secondary batteries) and lithium polymer batteries are typical examples encompassed by "lithium secondary battery" in this invention. Also, in this Description, "active material" refers to a material which reversibly intercalates and deintercalates the chemical species (lithium ions) serving as the charge carrier. The nonaqueous electrolyte secondary battery disclosed herein is described in detail below using, by way of illustration, a case in which the battery is a lithium ion battery.

<Lithium Ion Battery>

Figure 1:
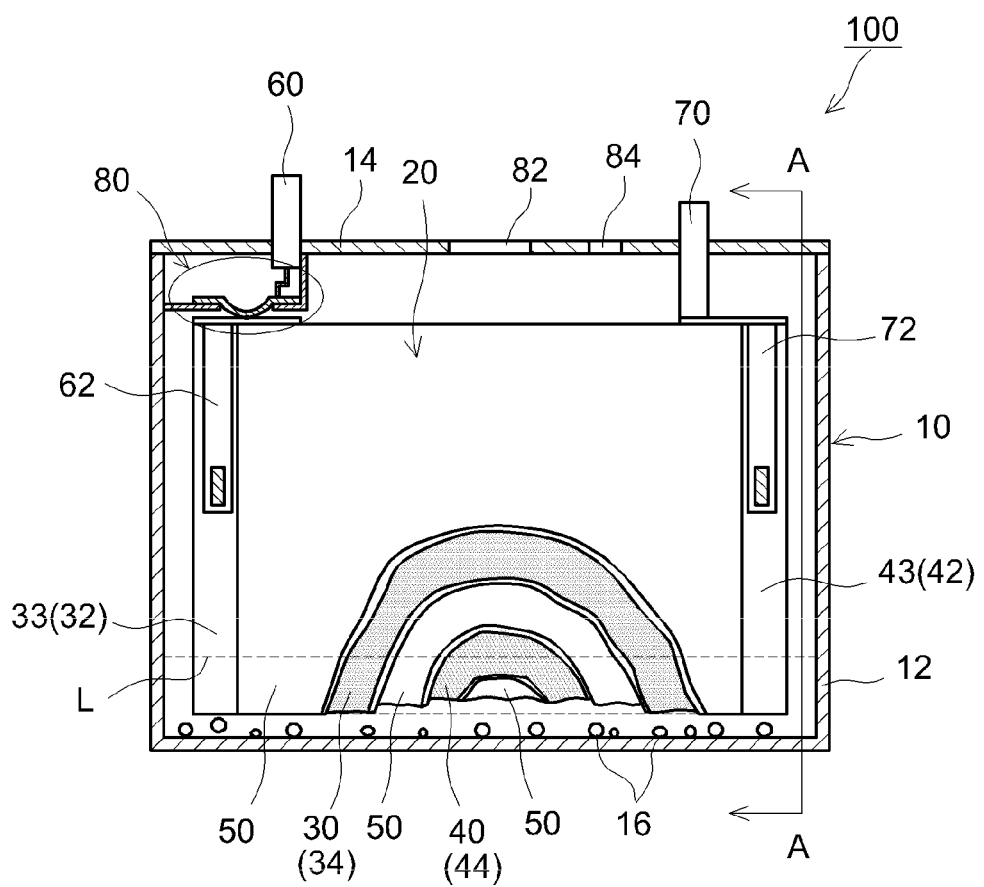
FIG. 1 is a cross-sectional diagram schematically showing the construction of a nonaqueous electrolyte secondary battery according to one embodiment of the invention.

FIG. 1 is a cross-sectional schematic view showing the construction of a nonaqueous electrolyte secondary battery 100 according to one embodiment of the invention. This lithium ion battery 100 substantially includes a flat wound electrode assembly 20, a nonaqueous electrolyte (not shown), and a battery case 10 which houses the flat wound electrode assembly 20 and the nonaqueous electrolyte.

Figure 2:
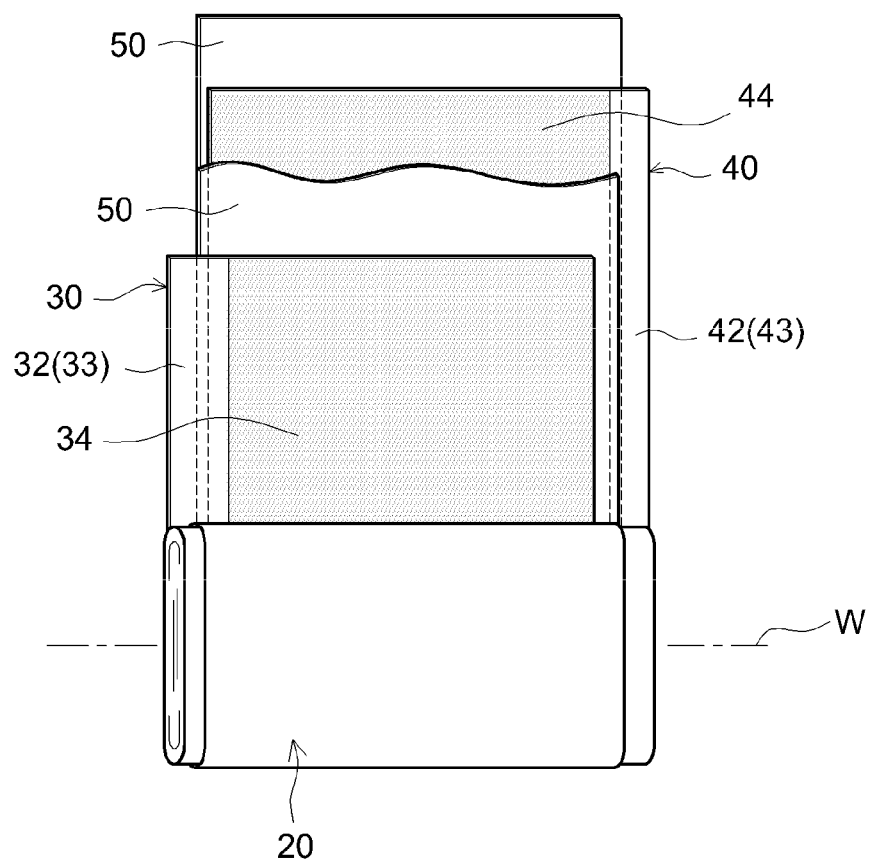
FIG. 2 is a schematic diagram illustrating the construction of the flat wound electrode assembly in a nonaqueous electrolyte secondary battery according to an embodiment of the invention.

FIG. 2 a diagram illustrating the construction of the flat wound electrode assembly 20. The flat wound electrode assembly 20 has a strip-shaped positive electrode 30 and a strip-shaped negative electrode 40 which are arranged with a separator 50 therebetween and wound in such a way that the assembly has a cross-sectional shape perpendicular to the winding axis which is oval.

<Positive Electrode>

The strip-shaped positive electrode 30 typically has a strip-shaped positive electrode current collector 32, and a positive electrode active material layer 34 held on the positive electrode current collector 32. The positive electrode current collector 32 typically has an exposed current collector region 33 provided in the form of a strip along one edge in the lengthwise direction thereof, and has a positive electrode active material layer 34 provided in a region other than this exposed current collector region 33. The positive electrode active material layer 34 may be provided on both sides of the positive electrode current collector 32, or may be provided on only one of the sides. The positive electrode current collector 32 is preferably a current-collecting member made of a metal having a good electrical conductivity (e.g., aluminum, nickel). This positive electrode active material layer 34 includes at least a positive electrode active material, and has a porous structure so as to allow the impregnation of a nonaqueous electrolyte.

Here, the positive electrode active material is a material capable of intercalating and deintercalating lithium ions. For example, preferred use can be made of lithium-containing compounds (e.g., lithium-transition metal mixed oxides) which contain lithium and one, two or more transition metal elements. Such lithium-transition metal oxides include lithium-nickel mixed oxides (e.g., $LiNiO_2$), lithium-cobalt mixed oxides (e.g., $LiCoO_2$), lithium-manganese mixed oxides (e.g., $LiMn_2O_4$), and tertiary lithium-containing mixed oxides such as lithium-nickel-cobalt-manganese mixed oxides (e.g., $LiNi_{1/3}Co_{1/3}Mn_{1/3}O_2$).

The positive electrode active material layer 34 may optionally include, in addition to the positive electrode active material, one, two or more materials capable of being used as ingredients of the positive electrode active material layer in conventional lithium ion batteries. Examples of such materials include conductive materials and binders. Illustrative examples of conductive materials that may be advantageously used include carbon materials such as various carbon blacks (e.g., acetylene black, ketjen black), activated carbon, graphite and carbon fibers. Illustrative examples of binders include vinyl halide resins such as polyvinylidene fluoride (PVdF), polyalkylene oxides such as polyethylene oxide (PEO), and rubbers such as styrene-butadiene rubber (SBR).

To achieve a high energy density, it is suitable to set the amount of positive electrode active material in the overall positive electrode active material layer 34 to from about 60 mass % or more (typically from 60 mass % to 95 mass %); it is generally preferable for this amount to be from about 70 mass % to 95 mass %. In cases where a binder is used, to ensure good mechanical strength (shape retention), the amount of binder in the overall positive electrode active material layer may be set to, for example, from about 0.5 mass % to 10 mass %; it is generally preferable to set this to from about 1 mass % to about 5 mass %. When a conductive material is used, to achieve both high output characteristics and a high energy density, the amount of the conductive material in the overall positive electrode active material layer may be set to from about 1 mass % to about 20 mass %; it is generally preferable to set this to from about 2 mass % to 10 mass %.

The thickness of the positive electrode active material layer 34 is not particularly limited, and may be set to, for example, 20 μm or more, typically 50 μm or more, and to 200 μm or less, typically 100 μm or less. The mass (coating weight) of the positive electrode active material layer 34 provided per unit surface area of the positive electrode current collector 32, from the standpoint of achieving a high energy density, may be set to 3 $mg/cm^2$ or more (e.g., 5 $mg/cm^2$ or more, typically 7 $mg/cm^2$ or more) per side of the positive electrode current collector 32. To achieve excellent power characteristics, the coating weight per side of the positive electrode current collector 32 may be set to 100 $mg/cm^2$ or less (e.g., 70 $mg/cm^2$ or less, typically 50 $mg/cm^2$ or less). The average thickness per side of the positive electrode active material layer 34 may be set to, for example, 20 μm or more (typically, 40 μm or more) and 100 μm or less (typically, 80 μm or less). The density of the positive electrode active material layer 34 may be set to, for example, 1.0 $g/cm^3$ or more (typically, 2.0 $g/cm^3$ or more) and 4.5 $g/cm^3$ or less (e.g., 4.0 $g/cm^3$ or less).

<Negative Electrode>

The strip-shaped negative electrode 40 typically includes a strip-shaped negative electrode current collector 42 which has, on one edge along a lengthwise direction thereof, a exposed current collector region 43, and is provided with, on a region other than this current collector-exposing region 43, an active material layer 44. The negative electrode exposed current collector region 43 is typically provided in the form of a strip along one edge in the width direction of the negative electrode current collector 42. The negative electrode active material layer 44 may be provided on both sides of the negative electrode current collector 42, or may be provided on only one of the sides. The negative electrode current collector 42 is preferably an electrically conductive member made of a metal having a good electrical conductivity (e.g., copper, nickel). This negative electrode active material layer 44 includes at least a negative electrode active material, and has a porous structure so as to allow the impregnation of a nonaqueous electrolyte.

One, two or more of the various materials known to be capable of being used as negative electrode active materials in lithium ion batteries may be utilized here as the negative electrode active material. Preferred examples include carbon materials such as graphite, non-graphitizable carbon (hard carbon), graphitizable carbon (soft carbon) and carbon nanotubes, as well as combinations thereof. Of these, from the standpoint of energy density, preferred use can be made of graphitic materials such as natural graphite (plumbago) and synthetic graphite. As such graphitic materials, preferred use can be made of materials in which amorphous carbon is disposed on at least part of the surface. A form in which substantially the entire surface of granular carbon is coated with an amorphous carbon film is more preferred.

The negative electrode active material layer 44 may optionally include, in addition to the negative electrode active material, one, two or more materials capable of being used as ingredients of the negative electrode active material layer 44 in conventional lithium ion batteries. Examples of such materials include binders and various types of additives. Binders that may be suitably used include ones similar to the binders used in the negative electrodes of conventional lithium ion batteries. For example, a binder similar to that in the positive electrode 30 may be used. As a preferred embodiment, in cases where the aqueous solvent is used to form the negative electrode active material layer 44, preferred use can be made of rubbers such as styrene-butadiene rubber (SBR), and water-soluble or water-dispersible polymer materials such as polyethylene oxide (PEO) and vinyl acetate copolymers. In addition, various other additives such as thickeners, dispersants and conductive materials may also be suitably used. Examples of thickeners include carboxymethyl cellulose (CMC), methyl cellulose (MC), and cellulosic polymers such as cellulose acetate phthalate (CAP).

The amount of negative electrode active material in the overall negative electrode active material layer 44 is suitably set to about 50 mass % or more, and is preferably set to generally from 90 mass % to 99 mass % (e.g., from 95 mass % to 99 mass %). By doing so, a high energy density can be achieved. In cases where a binder is used, the amount of binder in the overall negative electrode active material layer 44 may be set to, for example, from about 1 mass % to about 10 mass %, and is preferably set to generally from about 1 mass % to about 5 mass %. The mechanical strength (shape retention) of the negative electrode active material layer 44 can thus be advantageously ensured, enabling a good durability to be achieved. In cases where a thickener is used, the amount of thickener in the overall negative electrode active material layer 44 may be set to, for example, from about 1 mass % to about 10 mass %, and is preferably set to generally from about 1 mass % to about 5 mass %.

The mass (coating weight) of the negative electrode active material layer 44 provided per unit surface area of the negative electrode current collector 42, from the standpoint of achieving a high energy density and a high output density, may be set to 5 mg/cm$^2$ or more (typically, 7 mg/cm$^2$ or more) and about 20 mg/cm$^2$ or less (typically, 15 mg/cm$^2$) per side of the negative electrode current collector 42. The thickness per side of the negative electrode active material layer 44 may be set to, for example 40 μm or more (typically, 50 μm or more), and 100 μm or less (typically, 80 μm or less). The density of the negative electrode active material layer 44 may be set to, for example, 0.5 g/cm$^3$ or more (typically, 1.0 g/cm$^3$ or more), and 2.0 g/cm$^3$ or less (typically, 1.5 g/cm$^3$ or less).

<Separator>

The separator 50 is a structural member which, in addition to electrically isolating the positive electrode 30 and the negative electrode 40, holds a charge carrier and is permeable to this charge carrier. Such a separator 50 can be advantageously constructed of a microporous resin sheet made of various types of materials. Although not particularly limited, owing to the relationship with the subsequently described inorganic aggregate 16, it is preferable for the pores in the separator 50 to be smaller than the particle size of the inorganic aggregate 16. For example, the average pore size of the separator 50 is preferably about 0.01 μm or more and about 6 μm or less, more preferably about 0.02 μm or more and about 4 μm or less, and most preferably about 0.05 μm or more and about 2 μm or less. This separator 50 may be constructed in such a way as to provide a shutdown function that softens and fuses the constituent material when the flat wound electrode assembly 20 reaches a given temperature, blocking passage of the charge carrier. For example, a microporous sheet composed of a polyolefin resin such as polyethylene (PE) or polypropylene (PP) is capable of suitably setting the shutdown temperature in the range of 80° C. to 140° C. (typically, 110° C. to 140° C., such as 120° C. to 135° C.), and is thus preferred as the separator 50.

The separator 50 may be provided with, on one or both sides of the microporous resin sheet as the base material, a heat-resistant layer (HRL) composed of heat-resistant particles having heat resistance and electrically insulating properties. The heat-resistant particles are not particularly limited, although preferred use can be made of a metal oxide such as alumina or silica. Such an arrangement can prevent the positive electrode 30 and negative electrode 40 from shorting even when the temperature of the flat wound electrode assembly 20 becomes higher than the melting point of the separator 50, causing the separator 50 to shrink or break.

The average thickness of the separator 50 as a whole is not particularly limited, and may be set to generally 10 μm or more, and typically 15 μm or more, such as 17 μm or more. The upper limit may be set to 40 μm or less, and typically 30 μm or less, such as 25 μm or less. At an average thickness within the above range, the permeability to the charge carrier can be well-maintained and microshorting (leakage current) is less likely to occur. As a result, high input-output density and safety can both be achieved.

<Flat Wound Electrode Assembly>

Using the positive electrode 30, negative electrode 40 and separator 50 thus prepared, a flat wound electrode assembly 20 like that shown in FIG. 2 can be constructed. A strip-shaped positive electrode 30 and a strip-shaped negative electrode 40 are stacked together, with two strip-shaped separators 50 in between, and wound in the lengthwise direction. In other words, they are wound in, as the winding axis W, the width direction perpendicular to the lengthwise direction. Winding is carried out in such a manner that the assembly has a cross-sectional shape perpendicular to the winding axis W which is oval. The flat wound electrode assembly 20 having such an oval cross-section may be shaped by compressing and flattening, in a direction perpendicular to the winding axis, a wound electrode assembly that has been cylindrically wound. Alternatively, the flat wound electrode assembly 20 may be formed by winding in a flattened shape around a flat winding axis. The flat wound electrode assembly 20 can be obtained in this way. The detailed shape of such a flat wound electrode assembly 20 can be suitably modified in accordance with the shape of the battery case 10 to be used.

Figure 3A:
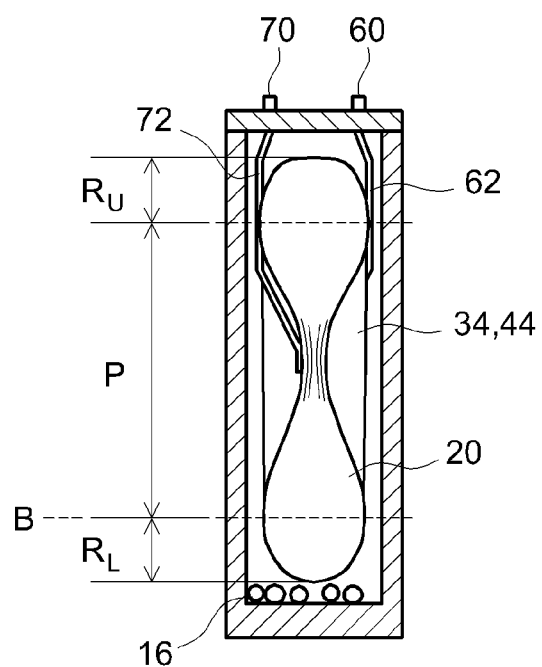
FIG. 3A is a diagram taken along line A-A in FIG. 1.
Figure 3B:
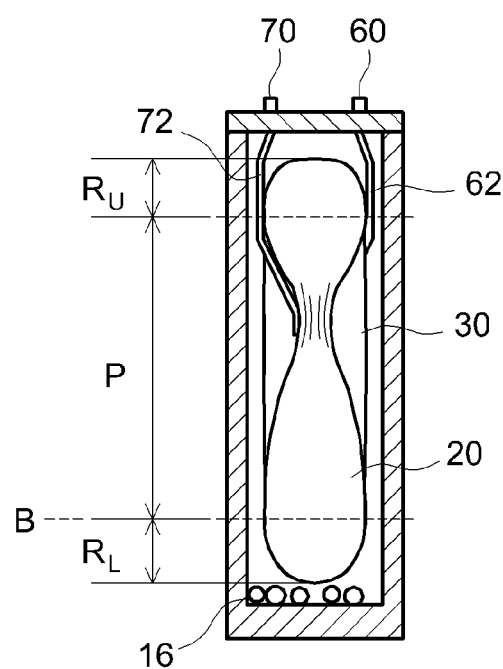
FIG. 3B is a cross-sectional schematic diagram in the winding axis direction of a nonaqueous electrolyte secondary battery according to another embodiment.

When stacking together the positive electrode 30, the negative electrode 40 and the separators 50, the positive electrode 30 and the negative electrode 40 are placed over one another at somewhat of an offset in the width direction in such a way as to have the exposed current collector region 33 of the positive electrode 30 and the exposed current collector region 43 of the negative electrode 40 protrude from both sides in the width direction of the separator 50, each on a different side. As a result, in the winding axis W direction of the flat wound electrode assembly 20, the positive electrode exposed current collector region 33 and the negative electrode exposed current collector region 43 protrude outward from their respective winding core regions (that is, the regions where the positive and negative active material layers 34, 44 face each other). By gathering together the positive electrode exposed current collector region 33 and the negative electrode exposed current collector region 43 in the minor axis direction of the oval to form a current collecting area, highly efficient current collection can be carried out. The position of this current-collecting area may be, as shown in FIG. 3A for example, near the center in the major axis direction of the oval, or may be, as shown in FIG. 3B for example, above the center in the major axis direction of the oval. In the art disclosed herein, forming the current-collecting area above the center in the major axis direction may be a preferred embodiment.

<Nonaqueous Electrolyte>

An electrolyte obtained by dissolving or dispersing a supporting salt (e.g., lithium salt in lithium ion batteries) in a nonaqueous solvent may typically be used as the nonaqueous electrolyte.

Various types of organic solvents suitable for liquid electrolytes in conventional lithium ion batteries, such as carbonates, ethers, esters, nitriles, sulfones and lactones, may be used as the nonaqueous solvent. Illustrative examples include ethylene carbonate (EC), propylene carbonate (PC), diethyl carbonate (DEC), dimethyl carbonate (DMC) and ethyl methyl carbonate (EMC). These nonaqueous solvents may be used singly or two or more may be used as a mixed solvent.

Various supporting salts capable of being used in conventional lithium ion batteries may be suitably selected and used as the supporting salt. For example, use can be made of lithium salts such as $LiPF_6$, $LiBF_4$, $LiClO_4$, $LiAsF_6$, $Li(CF_3SO_2)_2N$ and $LiCF_3SO_3$. These supporting salts may be used singly or two or more may be used in combination. These supporting salts are preferably adjusted so that the concentration in the nonaqueous electrolyte falls within the range of 0.7 mol/L to 1.3 mol/L.

In the art disclosed herein, this nonaqueous electrolyte includes an electrically insulating inorganic aggregate 16. The inorganic aggregate 16 is not particularly limited as to the type of material and other characteristics, provided it is an electrically insulating inorganic material capable of stably existing in the service environment for the target battery 100. For example, preferred use can be made of powders that are electrically insulating and made of a chemically stable metal oxide, such as alumina, silica, zirconia, yttria and mullite. Preferred use can be made of an inorganic aggregate 16 having an average particle size which is larger than the average pore size of the separator 50. The average particle size of the inorganic aggregate 16 is not particularly limited. For example, it may be set to preferably 0.1 μm or more and 10 μm or less, more preferably 0.3 μm or more and 8 μm or less, and most preferably 0.5 μm or more and 5 μm or less.

The nonaqueous electrolyte may include various additives, provided this does not detract from the characteristics of the inventive nonaqueous electrolyte secondary battery. Film-forming agents, overcharge additives and the like may be used as such additives for one, two or more purposes from among, for example, enhancing the input-output characteristics of the battery, enhancing the cycle characteristics, increasing the initial charge-discharge efficiency and improving safety. Illustrative examples of such additives include film-forming agents such as lithium bis(oxalate) borate (LiBOB), vinylene carbonate (VC), vinyl ethylene carbonate (VEC) and fluoroethylene carbonate (FEC); overcharge additives composed of compounds which can generate a gas during overcharging, including aromatic compounds such as biphenyl (BP) and cyclohexylbenzene (CHB); surfactants; dispersants; thickeners; and anti-freezing agents. The concentration of these additives in the overall nonaqueous electrolyte, although this varies also with the type of additive, may be set to, for example, generally about 0.1 mol/L or less (typically from 0.005 mol/L to 0.05 mol/L) in the case of film-forming agents, and generally about 6 mass % or less (typically, from 0.5 mass % to 4 mass %) in the case of overcharge additives.

<Inorganic Aggregate within Battery Case>

The lithium ion battery 100 can then be assembled by placing the flat wound electrode assembly 20 and the nonaqueous electrolyte prepared as described above in the battery case 10.

Here, as shown in FIGS. 3A and 3B, the flat wound electrode assembly 20 can be divided into a planar region P where the electrode faces are planar, an upper wound curved region $R_U$ which is positioned vertically upward from the planar region P and where the electrode faces are curved surfaces, and a lower wound curved region $R_L$ which is positioned vertically downward from the planar region P and where the electrode faces are curved surfaces. In addition, the space between the battery case 10 and the flat wound electrode assembly 20 can be divided by a boundary plane B between the planar region P and the lower wound curved region $R_L$.

The battery 100 disclosed herein is characterized in that the amount $M_O$ of the inorganic aggregate 16 included in the space which is lower than the boundary plane B and the amount $M_I$ of the inorganic aggregate included in the electrolyte impregnated in the overall flat wound electrode assembly 20 satisfies the relationship $M_O > M_I$.

Here, according to investigations by the inventors, there exists a desire for the use of lithium ion batteries 100 in very low-temperature environments of, e.g., −50° C. or below. In such a very low-temperature environment, the phenomena of viscosity increases and freezing do not readily arise in, of the nonaqueous electrolyte, the electrolyte that has been impregnated into the flat wound electrode assembly 20 (i.e., the impregnating electrolyte). However, compared with the impregnating electrolyte, the phenomena of viscosity increases and freezing arise with relative ease in the surplus electrolyte that collects within the battery case 10. Contemplating the reasons for this, the inventors realized that the impregnating electrolyte is present within pores in the positive electrode active material 34, negative electrode active material 44 and separator 50, all of which have porous structures, whereas the surplus electrolyte is able to come into direct contact with, for example, the battery case. Because the positive electrode active material 34, negative electrode active material 44 and separator 50 have low thermal conductivities compared with the battery case 10, for example, and are moreover porous, they have high heat-retaining properties. The disparity between the properties of the impregnating electrolyte and the surplus electrolyte in low-temperature environments is thought to arise from differences such as these. Moreover, it may be important to suppress viscosity increases and freezing of the surplus electrolyte in very low-temperature environments.

With regard to the surplus electrolyte, it was found from extensive research by the inventors that including an inorganic aggregate suppresses the harmful effects of such viscosity increases and freezing. Inorganic aggregate that has been added to the surplus electrolyte typically settles to the bottom of the battery case. It is thought that, depending on the form in which it exists, such an inorganic aggregate can effectively shield out influences imparted to the surplus electrolyte by an external low-temperature environment. Moreover, it is likely that, even when the amount of inorganic aggregate included in the surplus electrolyte is very small, a viscosity increase and freezing suppressing effect can be obtained. However, to obtain an unprecedented and reliable surplus electrolyte viscosity increase and freezing suppressing effect, it is preferable for a sufficient amount of the inorganic aggregate 16 to be included in the surplus electrolyte while also taking into consideration the inorganic aggregate 16 that can be included in the flat wound electrode assembly 20. The amount of surplus electrolyte can easily be changed according to the battery design, although this can generally be set based on the position of the boundary plane B (and, in turn, of the lower wound curved region $R_L$). From such circumstances and perspectives, in the art disclosed herein, satisfying the relationship $M_O > M_I$ has been established as the condition for obtaining a more reliable surplus electrolyte viscosity increase and freezing suppressing effect.

Even in conventional batteries, for example, unintended loss (peeling) of the active material or active material layer may arise due to, for example, expansion and contraction of the active material with charging and discharging. When this active material or active material layer peels from the flat wound electrode assembly and becomes present in the surplus electrolyte, it may impart an action similar to that of the inorganic aggregate disclosed herein. However, in conventional batteries, the nonaqueous electrolyte viscosity increase and freezing suppressing effect by this detached active material or active material layer does not advantageously appear. To clearly suppress increased viscosity and freezing of a nonaqueous electrolyte, it is preferable for the inorganic aggregate within the surplus electrolyte to be present in an amount that is larger than the amount of active material or active material layer that can generally peel off; that is, in an amount that is larger than the amount of active material, active material layer and inorganic aggregate included within the flat wound electrode assembly in a state capable of becoming free.

The amount $M_O$ of inorganic aggregate present in the space outside of the flat wound electrode assembly 20 and lower than the boundary plane B can be determined by the following procedure. First, the battery case 10 is opened, such as by removing the sealing member 14 on the battery case 10 or the lid on a fill port or by cutting away the top of the case body 12. Next, the amount of surplus electrolyte present in the space between the battery case 10 and the flat wound electrode assembly 20 is checked. If the level of the surplus electrolyte is lower than the boundary plane B, electrolyte is added up to the boundary plane B. If the level of the surplus electrolyte is higher than the boundary plane B, electrolyte is extracted until the liquid level of the electrolyte reaches the boundary plane B. The flat wound electrode assembly 20 is then taken out of the case body 12 and both the mass of the inorganic aggregate 16 remaining within the case body 12 and the mass of the electrolyte remaining within the case body 12 are measured. The ratio of the mass of the inorganic aggregate 16 to the mass of the sum of the electrolyte and the inorganic aggregate 16 is calculated from these values and treated as the amount $M_O$ of inorganic aggregate 16 included in the space lower than the boundary plane B.

The amount $M_I$ of inorganic aggregate included in the electrolyte in the flat wound electrode assembly 20 can be determined by the following procedure. First, as in the case of determining the amount $M_O$ of inorganic aggregate included in the surplus electrolyte, the flat wound electrode assembly 20 is taken out of the case body 12. Next, the flat wound electrode assembly 20 that has been taken out is rinsed with distilled water or the like, the inorganic aggregate 16 that has been rinsed off is recovered by a technique such as filtration, and the mass thereof is measured. The void volume of the positive electrode active material layer 34, the void volume of the negative electrode active material layer 44 and the void volume of the separator 50, which together represent the impregnation space for the impregnating electrolyte within the flat wound electrode assembly 20, are calculated. Treating the sum of the void volumes of these respective structural members (positive electrode active material layer, negative electrode active material layer, separator) as the impregnation space, the mass of a volume of electrolyte corresponding to this impregnation space is calculated. Next, the ratio of the mass of the recovered inorganic aggregate 16 to the sum of the mass of electrolyte corresponding to the impregnation space and the mass of the recovered inorganic aggregate 16 is calculated. This ratio can be treated as the amount $M_I$ of inorganic aggregate included in the impregnating electrolyte.

The void volumes of each of the structural members may be calculated as shown below for, by way of illustration, the positive electrode active material layer 34.

First, the void volume per unit surface area of the positive electrode active material layer 34 (mL/cm$^2$) is determined. To this end, a given surface area of the positive electrode active material layer 34 is removed from the positive electrode 30 with a punch or the like, and the mass of the positive electrode active material layer 34 per unit surface area (g/cm$^2$) is measured. The positive electrode active material layer mass per unit surface area (g/cm$^2$) thus measured is then multiplied by the weight ratios (compounding ratio) of the respective constituent materials (such as positive electrode active material, conductive material, binder, etc.) included in the active material layer, and the mass per unit surface area (g/cm$^2$) of each of the constituent materials is determined. By dividing this by the true specific gravities (g/mL) of each constituent material, the volume per unit surface area (mL/cm$^2$) of each constituent material can be determined (see the example formula for calculating the volume of the positive electrode active material in Formula 1 below).

[volume of positive electrode active material per unit surface area]=[mass of positive electrode active material layer per unit surface area]×[ratio of positive electrode active material]/[true specific gravity of positive electrode active material]     Formula 1:

Next, the volume of voids present in the positive electrode active material layer per unit surface area of the positive electrode active material layer (mL/cm$^2$) can be determined by subtracting all of the volumes per unit surface area (mL/cm$^2$) determined above for the respective constituent materials from the apparent volume per unit surface area (mL/cm$^2$) of the positive electrode active material layer. For example, in a case where the constituent materials of the positive electrode active material layer are a positive electrode active material, a conductive material and a binder, this can be calculated based on Formula 2 below. By multiplying this value by the surface area of the actual positive electrode active material layer 34, the void volume of the overall positive electrode active material layer 34 can be calculated. The average thickness of the positive electrode active material layer may be used directly as the apparent volume per unit surface area of the positive electrode active material layer.

[void volume per unit surface area of positive electrode active material]=[apparent volume of positive electrode active material layer per unit surface area]−{[volume of positive electrode active material per unit surface area]+[volume of conductive material per unit surface area]+[volume of binder per unit surface area]}   Formula 2:

However, in cases where the above calculations are difficult, for example, the amount of inorganic aggregate 16 included in the surplus electrolyte below the boundary plane B may be set to, on a mass basis, 0.01 ppm or more and 100 ppm or less (preferably 0.05 ppm or more and 50 ppm or less, and more preferably 0.1 ppm or more and 10 ppm or less). The relationship $M_O > M_I$ can be reliably satisfied in this way. Moreover, the addition of surplus inorganic aggregate is prevented, enabling the desired effects to be achieved without excessively increasing the battery weight.

The battery case 10 includes a rectangular case body 12 having an opening for inserting the flat wound electrode assembly 20, and a sealing member 14 which seals the opening in the case body 12. These may be suitably used in the form of metal components made of, for example, aluminum or an aluminum alloy or iron or an iron alloy; plastic components made of polyamide or the like; or laminate film components. In the example shown in FIG. 1, the case body (outer case) 12 is a thin prismatic member made of an aluminum alloy that has a flat, box-like shape (typically, a parallelepiped shape) which is open at the top and closed on the bottom. The sealing member 14 is provided thereon with a positive electrode terminal 60 which is electrically connected to the positive electrode 30 of the wound electrode assembly 20 and a negative electrode terminal 70 which is electrically connected to the negative electrode 40 of the wound electrode assembly 20. Housing the wound electrode assembly 20 within the case body 12 in a state fixed to this sealing member 14 is desirable because this stabilizes the housing position and reduces the risk of damage.

When fixing the wound electrode assembly 20 to the sealing member 14, as shown in FIGS. 1 and 3A, the positive electrode exposed current conductor region 33 and the positive electrode terminal 60 (made of, for example, aluminum) may be bonded together via a positive electrode current-collecting member 62. This enables the positive electrode 30 of the flat wound electrode assembly 20 and the positive electrode terminal 60 to be electrically connected. Similarly, the negative electrode exposed current collector region 43 and the negative electrode terminal 70 (made of, for example, nickel) may be bonded together via a negative electrode current-collecting member 72. This enables the negative electrode 40 and the negative electrode terminal 70 to be electrically connected. With such a current-collecting structure, when the battery case 10 is placed on a horizontal surface with the sealing member 14 on top, the wound electrode assembly 20 is housed within the battery case 10 in such a way that the major axis of the oval is vertically oriented. In other words, it is housed within the battery case in such a way that the winding axis W becomes horizontally oriented. By injecting the nonaqueous electrolyte into the battery case 10 in this state, the winding axis W direction which is the direction of nonaqueous electrolyte impregnation is horizontal, which is desirable because impregnation by the nonaqueous electrolyte proceeds smoothly and the time required for impregnation by the nonaqueous electrolyte can be shortened. The positive and negative current-collecting members 62, 72, the positive and negative electrode terminals 60, 70 and the positive and negative electrode current collectors 32, 42 can be respectively bonded by, for example, ultrasonic welding, resistance welding or the like. Sealing of the opening in the case body 12 and the sealing member 14 can be preferably achieved by laser welding or the like.

A current interrupt device (CID) 80 which actuates when the pressure within the battery case 10 rises to a given pressure may be provided at the interior of the battery case 10. A fill port 84 for injecting nonaqueous electrolyte into the case body 12 in which the wound electrode assembly 20 has been received may typically be formed in the sealing member 14. In addition, as in conventional lithium ion battery cases, a safety valve 82 for releasing to the exterior of the battery case 10 gases that form at the interior of the battery case 10 during battery malfunction may be provided in the sealing member 14.

This lithium ion battery 100 may typically be used in the form of a battery pack in which a plurality of such batteries are connected in series and/or in parallel. In such cases, it is preferable to restrain the battery in such a way that a pressure of 1 kN or more and 10 kN or less is applied to the planar region P of the flat wound electrode assembly 20. By doing so, the distance between the current collectors of the positive electrode and the negative electrode is reduced, making it easier to obtain a high power. This is also desirable because the surplus electrolyte readily collects in the space between the battery case 10 and the lower wound curved region $R_L$, enabling the advantages of the art disclosed herein to be even more pronounced.

Although the lithium ion battery 100 disclosed herein can be used in various applications, compared to conventional products, viscosity increase and freezing of the nonaqueous electrolyte at very low temperatures is suppressed. Therefore, it is especially preferred for outdoor use in regions where, for example, winter temperatures may fall to 0° C. or below, such as −30° C. or below, and even −50° C. or below. The art disclosed herein can be advantageously used particularly in large-size lithium ion batteries for high-power applications. Accordingly, by taking advantage of such characteristics, the inventive battery is especially preferred for use in applications requiring, for instance, high energy density characteristics and high input-output density characteristics, and in applications requiring a high reliability. Examples of such applications include on-board power sources for propelling vehicles such as plug-in hybrid vehicles (PHV), hybrid vehicles (HV) and electric vehicles (EV).

The nonaqueous electrolyte secondary battery disclosed herein is fabricated and its characteristics are evaluated in the concrete embodiments provided below. However, the invention is not intended to be limited to these embodiments.

Embodiment 1

<Construction of Lithium Ion Battery for Evaluation>
<Positive Electrode>

A positive electrode active material layer-forming slurry was prepared by weighing out $LiNi_{1/3}Co_{1/3}Mn_{1/3}O_2$ (NCM; average particle diameter, 6 μm; specific surface area, 0.7 m²/g) as the positive electrode active material, acetylene black (AB) as the conductive material and polyvinylidene fluoride (PVdF) as the binder to a mass ratio for these materials of NCM:AB:PVdF=91:6:3, adding N-methylpyrrolidone (NMP) to a nonvolatiles concentration (NV) of about 50 mass % and kneading. This slurry was coated as a strip, on each side of a 15 μm thick strip of aluminum foil as the positive electrode current collector, over a 94 mm wide region from one edge in the lengthwise direction and to a coating weight per side of 13.5 mg/cm², and then dried (5 minutes at a drying temperature of 80° C.), thereby producing a positive electrode sheet having a positive electrode active material layer. An exposed current collector region on which the positive electrode active material layer is not formed was provided on the other edge of the positive electrode sheet in the lengthwise direction. This was then compressed by rolling, thereby adjusting the density of the positive electrode active material layer to about 2.6 g/cm². The thickness of the positive electrode active material layer after rolling was about 50 μm per side (the thickness of the overall positive electrode was 115 μm).

<Negative Electrode>

A negative electrode active material layer-forming slurry was prepared by weighing out graphite (C; average particle diameter, 25 μm; specific surface area, 2.5 m²/g) as the negative electrode active material, styrene-butadiene rubber (SBR) as the binder and carboxymethyl cellulose (CMC) as the thickener in a mass ratio for these materials of C:SBR:CMC=98:1:1, adding deionized water and kneading. This slurry was coated as a strip, on each side of a strip-shaped 10 μm thick copper foil as the negative electrode current collector, over a 100 mm wide region from one edge in the lengthwise direction and to a coating weight per side of 7.3 mg/cm², and then dried (5 minutes at a drying temperature of 100° C.), thereby producing a negative electrode sheet having a negative electrode active material layer. An exposed current collector region on which a negative electrode active material layer is not formed was provided on the other edge of the negative electrode sheet in the lengthwise direction. This was then compressed by rolling, thereby adjusting the density of the negative electrode active material layer to about 1.1 g/cm². The thickness of the negative electrode active material layer after rolling was about 60 μm per side (the thickness of the overall negative electrode was 130 μm).

<Separator>

A separator with heat-resistant layer (HRL) having a width of 105 mm and a total thickness averaging 25 μm was used as the separator. A microporous sheet in the form of a strip having a three-layer construction (PP/PE/PP) consisting of polyethylene (PE) sandwiched on either side by polypropylene (PP) was used as the base material of the separator.

The positive electrode and negative electrode thus prepared were placed over one another with the separator in between, and wound in a cross-sectionally elliptical shape. At this time, the positive electrode and negative electrode were arranged so that the negative electrode active material layer covered the positive electrode active material layer in the width direction and the exposed portion of the positive electrode current collector and the exposed portion of the negative electrode current collector protrude on different sides in the width direction. The separator was arranged with the heat-resistant layer (HRL) facing the positive electrode side and such as to electrically isolate the positive and negative active material layers. The wound electrode assembly was compressed with a flat plate for 2 minutes at normal temperature (25° C.) under 4 kN/cm² of pressure and thus rendered into a flattened shape, thereby giving a wound electrode assembly.

Next, the flat wound electrode assembly was placed in a battery case. The battery case provided for this purpose was composed of a thin, prismatic (150 mm (W)×90 mm (H)×25 mm (D)) battery case body made of aluminum and having an opening on top, and a sealing member that closes the opening on the battery case body. A positive electrode terminal and a negative electrode terminal were attached to the sealing member, and these terminals were respectively welded, through current-collecting terminals, to the exposed portions of the positive electrode current collector and negative electrode current collector that protrude from the wound electrode assembly. The current-collecting terminal attaching positions (current-collecting positions) were positions situated 3 mm upward (i.e., on the terminal side) from the center of the major axis in the cross-sectional of the flat wound current collector. The wound electrode assembly that had been coupled with the sealing member was received into the interior of the battery case body through the opening therein, and the opening and the sealing member were welded (sealed). Hence, the flat wound electrode assembly was housed within the battery case in an arrangement where the winding axis W is oriented in the plane of the sealing member (i.e., horizontally).

The following two nonaqueous electrolytes were prepared.

The first electrolyte was obtained by dissolving $LiPF_6$ as the supporting salt to a concentration of 1.0 mol/L in a mixed solvent containing ethylene carbonate (EC), dimethyl carbonate (DMC) and ethyl methyl carbonate (EMC) in the volumetric ratio EC:DMC:EMC=3:4:3. To this mixed solvent was also added, in a proportion of 1 ppm (mass basis), alumina ($Al_2O_3$ particles having an average particle size of 0.5 μm as the inorganic aggregate, giving a nonaqueous electrolyte (Example 1). About 45 g of the nonaqueous electrolyte of Example 1 was then injected through a fill port provided in the sealing member of the battery case, thereby constructing an Example 1 lithium ion battery (cell assembly).

The second nonaqueous electrolyte (Example 2), aside from not adding an inorganic aggregate, was obtained in the same way as the nonaqueous electrolyte for Example 1. The nonaqueous electrolyte for Example 2 was similarly injected through a fill port provided in the sealing member of the battery case, thereby constructing an Example 2 lithium ion battery (cell assembly).

Both of these batteries had a theoretical capacity of 5 Ah. In the Example 1 battery, substantially all of the alumina particles added to the nonaqueous electrolyte settled to the bottom of the battery case, and the relationship $M_O > M_I$ was confirmed to hold between the amount $M_O$ of the inorganic aggregate included in the space located outside of the flat wound electrode assembly and below the boundary plane B between the planar region P and the lower wound curved region $R_L$ of the flat wound electrode assembly and the amount $M_I$ of the inorganic aggregate included in the electrolyte that has impregnated into the flat wound electrode assembly.

<Temperature Dependence of IV Resistance>

The Example 1 and 2 lithium ion batteries fabricated as described above were subjected to conditioning treatment at 25° C. in which the operations of constant-current charging at a charging rate of 0.1 C until the voltage across the positive and negative electrode terminals reaches 4.1 V, leaving the battery at rest for 10 minutes, then constant-current discharging at a discharge rate of 0.1 C to 3.0 V were repeated three times. Next, the IV resistance when constant-current (CC) discharging was carried out at a high rate of 10 A was measured while varying the environmental temperature over a range of −30° C. to −37° C. The results are shown as an Arrhenius plot in FIG. 4. On the abscissa in FIG. 4, the right side indicates a low measurement environment temperature, and the left side indicates a high measurement environment temperature.

Figure 4:
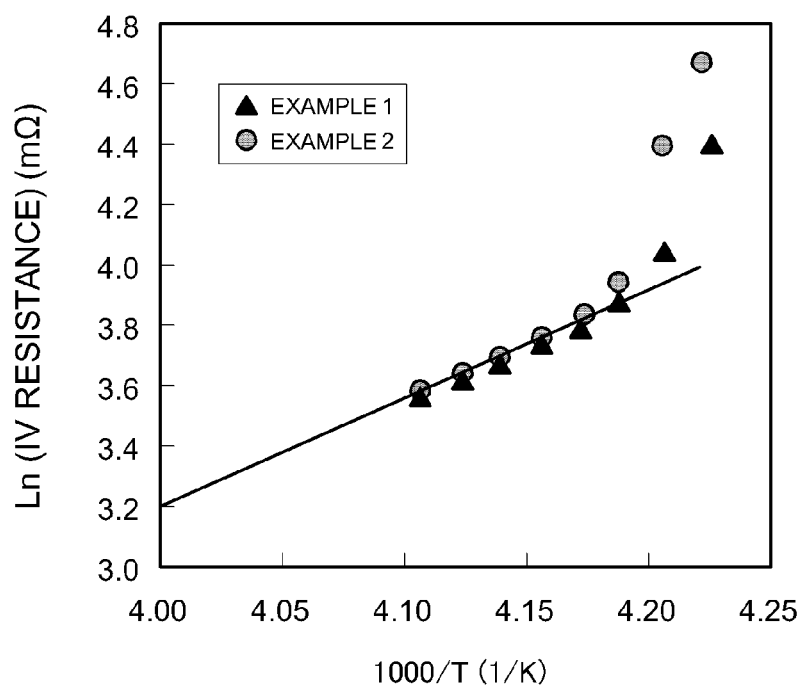
FIG. 4 is a graph showing the temperature dependence of the IV resistance of nonaqueous electrolyte secondary batteries.

As a result, as shown in FIG. 4, it is apparent that the IV resistances of the Example 1 and 2 batteries exhibit good temperature dependence in a temperature range of about −30° C. to −33° C. However, it was found that, in both the Example 1 and 2 batteries, under very low temperature conditions, the IV resistance rises abruptly at a given temperature. Here, the Example 1 battery in which an inorganic aggregate was included in the nonaqueous electrolyte maintains a low IV resistance to a lower temperature than the Example 2 battery in which inorganic aggregate was not included. This rise in the IV resistance is caused by increased viscosity and freezing of the nonaqueous electrolyte. It was thus confirmed that including an inorganic aggregate in the nonaqueous electrolyte suppresses increased viscosity and freezing of the nonaqueous electrolyte at such very low temperatures, thus suppressing a rise in the IV resistance.

Embodiment 2

An Example 3 lithium ion battery was built in the same way as in Example 1 in Embodiment 1. In addition, aside from changing the current-collecting position of the electrode assembly to the center in the electrode assembly height (major axis of electrode assembly cross-section) direction (that is, to a position about 3 mm lower than in Example 3), an Example 4 lithium ion battery was built under the same conditions as the Example 1 battery.

The IV resistances for the Example 3 and 4 batteries were measured when CC discharging at a high rate of 10 A was carried out in a range of −30° C. to −37° C. in the same way as in Embodiment 1. The results are shown as an Arrhenius plot in FIG. 5.

Figure 5:
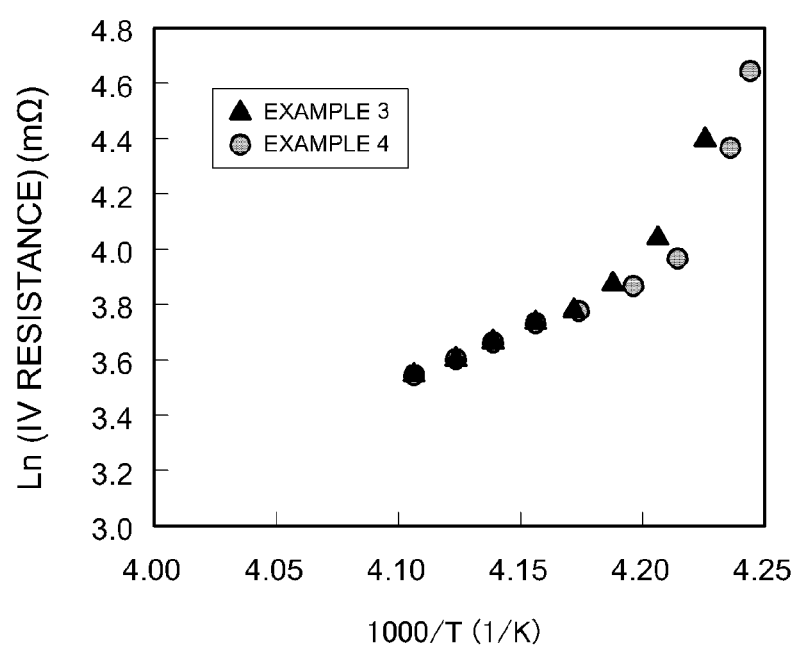
FIG. 5 is a graph showing the influence of the current-collecting position on the IV resistance of nonaqueous electrolyte secondary batteries.

As a result, as shown in FIG. 5, it is apparent that both the Example 3 and Example 4 batteries show good temperature dependence in a range of about −30° C. to −34° C. However, at temperatures lower than this, the Example 4 battery is clearly able to hold the resistance value down lower than the Example 3 battery. The reason appears to be that, in this embodiment, because the current-collecting position has been made somewhat lower, the inorganic aggregate-containing surplus electrolyte tends to collect on the lower side of the electrode assembly, increasing the freeze-preventing effect at low temperatures. What this means is that, the higher the current-collecting position above the center, the stronger the tendency for the resistance to rise. It is likely on account of this that the advantageous effects of the invention disclosed herein are able to appear so prominently.

The invention has been described in detail above by way of embodiments, although it should be noted that these embodiments are provided only by way of illustration and do not in any way limit the scope of the claims. Many variations and modifications to these embodiments are encompassed by the art recited in the claims of the present application.

REFERENCE SIGNS LIST

10 Battery case
12 Case body
14 Sealing member
20 Flat wound electrode assembly
30 Positive electrode
32 Positive electrode current collector
33 Positive electrode current collecting-exposing region
34 Positive electrode active material layer
40 Negative electrode
42 Negative electrode current collector
43 Negative electrode current collector-exposing region
44 Negative electrode active material layer
50 Separator
60 Positive electrode terminal
70 Negative electrode terminal
80 Current interrupt device (CID)
82 Safety valve
84 Fill port
100 Battery

The invention claimed is:

1. A nonaqueous electrolyte secondary battery comprising:
a flat wound electrode assembly, formed from a strip-shaped positive electrode and a strip-shaped negative electrode being arranged with a separator interposed therebetween, wound in such a manner that the assembly has an oval cross-sectional shape perpendicular to a winding axis;
a nonaqueous electrolyte, containing an electrically insulating inorganic aggregate, formed of an impregnating electrolyte that is impregnated into the flat wound electrode assembly and a surplus electrolyte that is not impregnated into the flat wound electrode assembly; and
a battery case, housing the flat wound electrode assembly and the nonaqueous electrolyte, comprising a prismatic case body having an opening therein for inserting the flat wound electrode assembly and a sealing member for sealing the opening in the case body,
wherein,
when the battery case is placed on a horizontal surface so that the sealing member becomes the top side of the battery case, the flat wound electrode assembly is housed within the battery case in such a manner that a major axis of the oval is vertically oriented, and
letting the flat wound electrode assembly be divided into a planar region where the electrode faces are planar, an upper wound curved region which is positioned vertically upward from the planar region and where the electrode faces are curved, and a lower wound curved region which is positioned vertically downward from the planar region and where the electrode faces are curved, and letting a space between the battery case and the flat wound electrode assembly be divided by a boundary plane B that includes a boundary between the planar region and the lower wound curved region,
an amount $M_O$ of the inorganic aggregate included in a space which is outside of the flat wound electrode assembly and below the boundary plane B and an amount $M_I$ of the inorganic aggregate included in the impregnating electrolyte within the flat wound electrode assembly satisfy the relationship $M_O > M_I$.

2. The nonaqueous electrolyte secondary battery according to claim 1,
wherein the positive electrode and the negative electrode each comprise a strip-shaped current collector having, on one edge along a lengthwise direction thereof, an exposed current collector region and is provided with, on a region other than the exposed current collector region, an active material layer,
the exposed current collector region of the positive electrode and the exposed current collector region of the negative electrode are arranged so as to protrude from, respectively, a first edge and a second edge of the wound electrode assembly in a width direction perpendicular to the lengthwise direction, and the positive electrode and the negative electrode are wound using the width direction as the axis of winding, and the wound electrode assembly is configured so as to collect current from the positive electrode and the negative electrode at a current-collecting area where the exposed current collector regions of the positive electrode and the negative electrode are respectively bunched up in a minor axis direction of the oval, and the current-collecting area is positioned above the center in the major axis direction of the oval.

3. The nonaqueous electrolyte secondary battery according to claim 1, wherein an amount of the inorganic aggregate included in the surplus electrolyte below the boundary plane B is 0.01 ppm or more and 100 ppm or less.

4. The nonaqueous electrolyte secondary battery according to claim 1, wherein the separator has pores therein, and the inorganic aggregate has an average particle size which is larger than an average pore size of the separator.

5. The nonaqueous electrolyte secondary battery according to claim 1, wherein the inorganic aggregate is at least one selected from the group consisting of alumina, silica, zirconia, yttria and mullite.

6. A battery pack comprising a plurality of the nonaqueous electrolyte secondary batteries according to claim 1, wherein the plurality of nonaqueous electrolyte secondary batteries are connected in series or in parallel.

7. The battery pack according to claim 6, wherein the plurality of nonaqueous electrolyte secondary batteries are restrained in such a manner as to apply a pressure of 1 kN or more and 10 kN or less to the planar region of the flat wound electrode assembly.

* * * * *